Dec. 11, 1951   J. E. MAHAN ET AL   2,578,565
HYDROGENATING SULFOLENES TO SULFOLANES
Filed Dec. 28, 1948
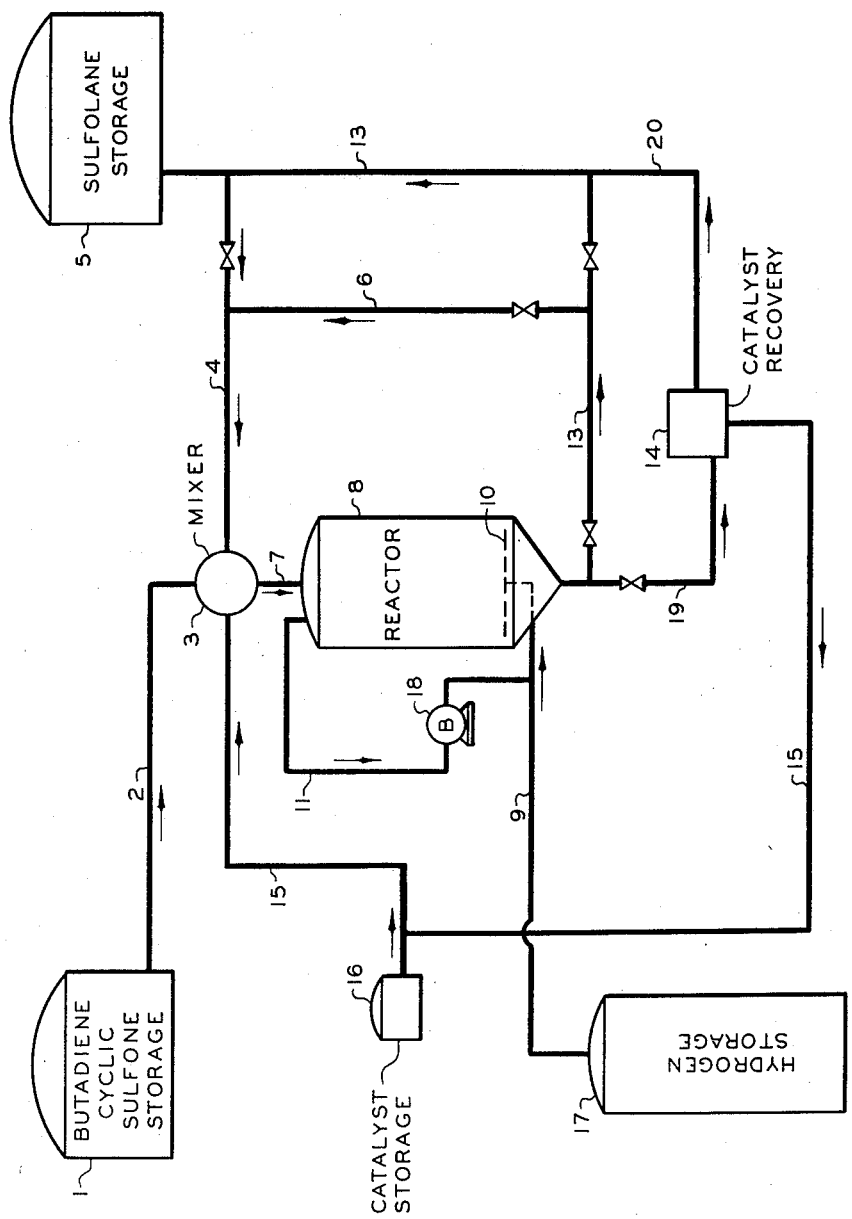
INVENTORS
J.E.MAHAN
S.C.FAUSKE
BY
Hudson & Young
ATTORNEYS

UNITED STATES PATENT OFFICE 2,578,565

HYDROGENATING SULFOLENES TO SULFOLANES

John E. Mahan and Sig C. Fauske, Bartlesville, Okla., assignors to Phillips Petroleum Company, a corporation of Delaware Application December 28, 1948, Serial No. 67,745

15 Claims. (Cl. 260—332.1)

This invention relates to the production of sulfolanes by the hydrogenation of the corresponding unsaturated sulfolenes. In one particular embodiment it relates to an improved process for the production of 2,3,4,5-tetrahydrothiophene-1,1-dioxide, commercially known as sulfolane, by the catalytic hydrogenation of the corresponding unsaturated cyclic butadiene monosulfone, i. e. 2,5-dihydrothiophene-1,1-dioxide, commercially known as sulfolene, in the presence of a novel solvent.

The term "a sulfolene compound" as employed herein and in the appended claims, defines generically the unsubstituted and substituted unsaturated compounds comprising or containing a sulfolene nucleus, i. e. a five-membered ring of four carbon atoms and a sulfur atom, a single olefinic linkage between any two adjacent carbon atoms of said ring, and two oxygen atoms each of which is directly attached to the sulfur atom thereof. The generic term "a sulfolene" or "a sulfolene compound," therefore covers the simple unsubstituted sulfolenes, viz. the 3-sulfolene having the general structure

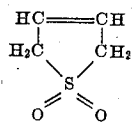

and the 2-sulfolene having the structure

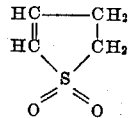

as well as the various substituted derivatives thereof, i. e. sulfolene compounds in which various organic and/or inorganic and particularly hydrocarbon radicals, i. e. alkyl, alkenyl, aryl, aralkyl, alkaryl, alicyclic and/or heterocyclic radicals, and/or such inorganic radicals as do not interfere with the hydrogenation reaction, are substituted for one or more of the hydrogen atoms of the above unsubstituted sulfolenes, provided the total molecule contains not over twelve carbon atoms.

Similarly, the term "a sulfolane compound" refers to a saturated sulfolene compound. In other words, the sulfolane compound contains or consists of a saturated five-membered ring of four carbon atoms and a sulfur atom, the latter having two oxygen atoms directly attached thereto. The structural formula of the simple unsubstituted sulfolane, therefore, is

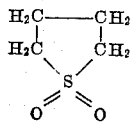

the generic term "a sulfolane" or "a sulfolane compound" covering not only the above compound but also the substituted derivatives thereof, particularly those in which various radicals mentioned in the preceding paragraph are substituted for one or more of the hydrogen atoms of the above structure. Where such a radical is hydrogenatable under the conditions of our process, it will be understood that the sulfolane containing the hydrogenated radical is included when reference is made to a sulfolane compound which "corresponds" to a given sulfolene compound. Thus, an alkyl sulfolane, such as a propyl or butyl sulfolane, corresponds to the alkenyl, such as allyl or butenyl respectively, sulfolene.

The material known as sulfolane, i. e. 2,3,4,5-tetrahydrothiophene-1,1-dioxide, has found valuable uses as an intermediate in the production of other useful organic chemicals, and as a selective solvent for hydrocarbons of various types, fatty acids or fatty acid esters, and the like. Various derivatives thereof have also been likewise employed, particularly 2,4-dimethyl sulfolane, which has been used as a selective solvent to separate aromatic hydrocarbons from petroleum fractions. A convenient type of raw material for the preparation of these various sulfolene compounds is found in the conjugated diolefins, which are readily converted by reaction with sulfur dioxide in known manner to unsaturated cyclic sulfones or sulfolenes. Thus, 2-methyl-1,3-pentadiene by reaction with sulfur dioxide forms 2,4-dimethyl-3-sulfolene, which may then be hydrogenated to the corresponding sulfolane. This is true of the various unsubstituted and substituted aliphatic conjugated diolefins, such as those ranging up to 12 carbon atoms per molecule. Similarly butadiene is reacted with sulfur dioxide to form the cyclic butadiene sulfone (sulfolene) which is convertible by hydrogenation to sulfolane. However since butadiene cyclic sulfone is a solid at room temperature, its hydrogenation to sulfolane must be carried out either in the presence of a suitable solvent or at temperatures above its melting point. As practiced in the past, both of these processes have disadvantages which make them undesirable. When operating in a solvent medium according to methods of the prior art recovery of catalyst, solvent, and product are necessary and time consuming operations. The catalyst is usually removed from the system by filtration after which the solution is fractionated to separate the solvent from the reaction product. This necessitates the use of expensive fractionation equipment and greatly extends the probability of handling losses. When pure butadiene cyclic sulfone is hydrogenated in the absence of a solvent medium at temperatures above its melting point with the usual hydrogenation catalysts, hydrogen absorption is normally incomplete. This process also has several disadvantages such as low yields, quick catalyst poisoning, and decomposition of reactants as evidenced by the pronounced odor of sulfur dioxide in the reactor effluent. Similar considerations are involved in the hydrogenation of the substituted sulfolenes.

It is an object of this invention to produce sulfolane compounds by an improved method of hydrogenating the corresponding sulfolenes. A further object is to obtain practically theoretical yields of sulfolane in the hydrogenation of sulfolene. Yet another object is to minimize or prevent decomposition of sulfolene compounds during catalytic hydrogenation thereof. Another object is to avoid the necessity of removing a solvent by distillation from a sulfolane product obtained by hydrogenation of a sulfolene in a solvent. Yet another object is to reduce greatly the amount of material which must be filtered to remove a suspended catalyst from the effluent of a sulfolene hydrogenation reaction. Further objects and advantages of the invention will be apparent, to one skilled in the art, from the accompanying disclosure and discussion.

We have now found that many advantages and greatly improved results may be obtained in hydrogenations of the type described by first dissolving the sulfolene to be hydrogenated, not in an extraneous solvent as has heretofore been done in the prior art, but rather in the corresponding sulfolane as a solvent. As applied specifically to the hydrogenation of butadiene cyclic sulfone, a significant feature of our process lies in the high solvent power of the solvent employed, namely sulfolane, for the sulfolene. We have found that two parts by weight of sulfolane will dissolve about three parts by weight of sulfolene at room temperature (30° C.). This is advantageous in that larger amounts of the butadiene cyclic sulfone are processed per unit equipment capacity when using sulfolane as an initially present solvent than with other, formerly used solvents of lower solvent power. Additionally, as will be shown hereinafter, the extent of conversion and the maintenance of catalytic activity are remarkably improved by the practice of our invention. Furthermore the former necessity of distilling off great quantities of extraneous solvents to obtain the final sulfolane product, which involves not only equipment and operating expense of great magnitude but also the decomposition and deterioration of the product due to the temperatures employed, is completely avoided. It will also be noted that the hydrogenation can be initiated and effected at reasonable temperatures, even those below the melting point of the sulfolene starting material, with the result that decomposition of reactants and products does not occur. Thus, while sulfolene melts at about 65° C., the corresponding sulfolane melts at 27–28° C. However, mixtures of the two are molten even down to 10° C. so that the hydogenation can be started and carried to partial completion at a temperature below the melting point of either pure compound if desired. Of course, for complete hydrogenation the final reaction temperature will be at least as high as the melting point of the sulfolane solvent-product. The 2,4-dimethyl-3-sulfolene melts at 39° C. while its hydrogenated product, 2,4-dimethylsulfolane melts at −3.3° C.; however, it is seldom advantageous to effect the hydrogenation reaction at this latter temperature. It may be pointed out that use of a sulfolane compound as solvent for its corresponding sulfolene is advantageous even when hydrogenating at temperatures above the melting point of the sulfolene, in that reduced catalyst poisoning and/or more complete conversion is often obtained as compared with hydrogenation of the sulfolene alone, and there is no necessity of distilling off an extraneous solvent from the reactor effluents. The invention in its broadest aspects may be practiced at any temperature at which decomposition is not so excessive as to stop the hydrogenation short of an economic yield, though of course it is preferred to avoid any decomposition, which is readily done in using the sulfolane as the solvent.

Any of the more active hydrogenation catalysts may be employed in our process. For economic reasons however we have preferred to use the more active base metal catalysts such as nickel, cobalt, chromium, copper-chromium oxide, and the like. These may be used in finely divided form such as, for example, Raney nickel, or may be suitably supported on kieselguhr, aluminum oxide, diatomaceous earth, and the like. A supported catalyst in pelleted form which we have found satisfactory comprises 70 to 80 per cent nickel on diatomaceous earth.

It is an advantage of our process that no solvent recovery steps are necessary and no catalyst poisoning is observed. It is a further advantage of our process that relatively mild conditions of operation provide substantially complete hydrogenation with little, if any, loss resulting from decomposition. It is still a further advantage of our method that the product is ready for shipment or immediate use as it flows from the process. These and other advantages of the invention will be further apparent from a description of the accompanying drawing in which is shown diagrammatically one form of apparatus in which our process can be carried out. The invention will be illustrated by specific reference to the hydrogenation of the simple butadiene cyclic monosulfone known as sulfolene (3-sulfolene) to form sulfolane, but the invention is readily adapted to the various substituted sulfolenes and sulfolanes with suitable modification wherever necessary which will be apparent to one skilled in the art.

In the drawing, butadiene cyclic sulfone (sulfolene) is withdrawn from storage 1, either as an unmelted solid or in the melted form (since the material is reasonably stable for limited periods of time and in the absence of catalyst at temperatures somewhat above its melting point), and is passed via line 2 to mixing chamber 3. Sulfolane is passed, preferably at about 30° C. at which temperature it is a liquid, from sulfolane storage 5 or recycle line 6, via line 4 to mixing chamber 3. The sulfolene-sulfolane solution prepared in mixing chamber 3 is passed via line 7 to reactor 8. Reactor 8 may be filled with a pelleted catalyst of the type mentioned above, or a finely divided catalyst may be suspended in the liquid reaction mixture therein. Hydrogen is admitted to the reactor from storage 17 via line 9 which terminates in a perforated disc 10 providing even distribution of the gas over the bottom of the reactor. In order to insure adequate contact of the reactants hydrogen gas may be removed from the top of reactor 8 through line 11 containing a blower 18 or other suitable circulating device and recycled with the hydrogen feed in line 9. The product is carried from reactor 8 via line 13 to storage 5.

When operating with a fixed bed catalyst agitating means will not ordinarily be required since the countercurrent stream of hydrogen through the catalyst bed usually provides adequate agitation. Flow rates of reactants are adjusted to provide a space velocity from about 1 to about 10 volumes of butadiene cyclic sulfone-sulfolane solution per volume catalyst per hour. We have generally preferred to operate using flow rates from about 2 to about 4 volumes of sulfolane solution per volume catalyst per hour.

When it is desirable to use a finely divided catalyst, the reactor 8 should be fitted with a stirrer or other agitating means, and a catalyst recovery step which is indicated diagrammatically by element 14 and which may comprise a centrifuge, filter, or other suitable apparatus will normally be required. In this event, that portion of the reactor effluent required as solvent for the reaction is passed without catalyst separation through lines 13, 6 and 4 to mixing zone 3 and thence via line 7 into reactor 8, whereas a portion which corresponds in quantity to the sulfolene feed is passed via line 19 to catalyst recovery unit 14 and thence via lines 20 and 13 to sulfolane storage vessel 5. Recovered catalyst is conveyed via line 15 either to catalyst storage unit 16 or on through line 15 into mixing zone 3. Catalyst concentrations in the range from 0.5 to 5 per cent by weight of the solution being processed are usually satisfactory although larger amounts may be used if desired. We have generally preferred to use these catalytic materials in concentrations of from 1 to 2 per cent by weight of reactants.

Temperatures in the range from about 10 to about 100° C. are suitable for the operation of this process and in fact any temperature is operable at which the reaction mixture is liquid, and which is below that at which the materials decompose severely. However, to avoid any possibility of thermal decomposition we usually operate below 50° C., preferably in the range from 10 to 40° C. While the melting point of sulfolane is about 27° C., and the melting point of sulfolene quite considerably higher (65° C.), solutions of the two are liquid as low as 10° C. so that the hydrogenation can be readily initiated at such a temperature if desired and completed at 27–28° C. or higher. Hydrogenation proceeds at hydrogen pressures above 50 pounds per square inch gauge and is effected quite rapidly and smoothly between 500 and 1500 pounds per square inch gauge. Pressures above this range may be employed if desired. A two to threefold mol excess of hydrogen over the sulfolene fed is usually maintained in the reactor at all times. Ordinarily the ratio of sulfolene compound to sulfolane compound will be within the range of 0.5:1 to 4:1 by weight, the maximum being limited by the solubility of the particular sulfolene in sulfolane at the temperatures employed. Thus, at 30° C. the ratio of 3-sulfolene to sulfolane is limited to 1.5:1, but is higher at higher temperatures. Ratios lower than 0.5:1 are seldom advantageous, while above 4:1 usually provides insufficient sulfolane solvent for realizing all of the benefits of the process. Ratios within the range of 1:1 to 2:1 are generally preferred.

Butadiene cyclic sulfone may be obtained from any suitable source. We have found it convenient to prepare it by the interaction of butadiene and sulfur dioxide by methods well known in the art. Any sulfolene compound may be employed as the starting material to produce the corresponding sulfolane compound. These sulfolene compounds may contain an olefinic or double bond in the 2-, 3- or 4-position in the ring, the various unsatisfied bonds of the nuclear carbon atoms of the sulfolene ring being taken up by hydrogen atoms and/or hydrocarbon radicals, particularly saturated aliphatic radicals. As examples of these sulfolene compounds which may be subjected to hydrogenation to produce a sulfolane compound corresponding to the starting sulfolene compound employed, reference is made to the following: 3-sulfolene, 2-sulfolene, 2 - methyl - 3 - sulfolene, 3 - methyl - 3 - sulfolene, 3 - methyl - 2 - sulfolene, 3 - ethyl - 3 - sulfolene, 3 - ethyl - 2 - sulfolene, 2,4 - dimethyl-3 - sulfolene, 2,4 - dimethyl - 2 - sulfolene, 2,4-dimethyl-4-sulfolene, and the like, and their homologues, as well as similar sulfolene compounds wherein other hydrocarbon radicals, as well as substituted hydrocarbon radicals which may be aliphatic, alicyclic, aromatic and/or heterocyclic, or other radicals, are directly attached to the various nuclear carbon atoms.

The following examples are offered as illustrative of certain specific aspects of the invention, and to show some of the advantages thereof. It will be apparent that the materials treated and the conditions employed are exemplary and that the broad scope of the invention is not limited thereto.

*Example I*

To show the advantages of using sulfolane as a solvent two runs were made. In the first (A), three parts by weight of butadiene cyclic sulfone was dissolved in two parts by weight of sulfolane in a pressure reactor at 30° C. Raney nickel equivalent to one per cent by weight of the butadiene cyclic sulfone was added as catalyst and the reactor sealed. Hydrogen was then pressured in at about 1000 pounds per square inch gauge with agitation until absorption ceased (about 20 hours). In the second run (B), butadiene cyclic sulfone without a solvent was charged to the reactor. Raney nickel equivalent to two per cent by weight of the charge was added and the reactor sealed. The temperature was then raised to about 65° C. to melt the charge and hydrogen was pressured in at about 1000 pounds per square inch gauge with agitation until absorption ceased (19½ hours). Results of the two runs are shown in the following tabulation:

| | Run A | Run B |
| --- | --- | --- |
| Conversion of Butadiene Cyclic Sulfone to Sulfolane. | Substantially Complete. | 33 Per cent. |
| Catalyst Condition at End of Run. | Active | Inactive. |
| Decomposition | None Detected | Pronounced Odor of Sulfur Dioxide. |

*Example II*

A run was made where in three parts by weight of butadiene cyclic sulfone was dissolved in two parts by weight of sulfolane in a pressure reactor at 30° C. Raney nickel equivalent to two per cent by weight of the solution was added as catalyst and the reactor sealed. Hydrogen was then pressured in at about 1000 pounds per square inch guage with agitation until absorption ceased (about 20 hours). At the end of this period the catalyst was allowed to settle and about half of the sulfolane decanted. This portion was replaced with an equal amount of butadiene sulfone and after it was hydrogenated in like manner a third portion was processed. Examination of the product by distillation indicated that hydrogenation was substantially complete. The product had a boiling range of 139.5–140° C. at 10 mm.

*Example III*

A run was made according to the method shown in the accompanying diagram using a pelleted catalyst comprising 72 per cent nickel on diatomaceous earth. The ratio of butadiene cyclic sulfone (3-sulfolene) to sulfolane in the mixing chamber was maintained between about 1.3:1 and 1.5:1 and flow of reactants was adjusted to provide a space velocity of 3 volumes of butadiene cyclic sulfone-sulfolane solution per volume catalyst per hour. Hydrogen was introduced concurrently at a rate such that a twofold molar excess of gas to sulfolene charged was maintained at all times. The temperature of the catalyst chamber was maintained between 27 and 30° C. Tests made on the effluent stream indicate that substantially pure sulfolane was produced.

We claim:

1. A process of producing a sulfolane which comprises catalytically hdrogenating a sulfolene in a reaction mixture consisting essentially of said sulfolene, hydrogen, an active base metal hydrogenation catalyst, and an initially-present sulfolane as a solvent.

2. A process of producing sulfolane which comprises catalytically hydrogenating sulfolene in a reaction mixture consisting essentially of sulfolene, hydrogen, an active base metal hydrogenation catalyst, and initially-present sulfolane as a solvent, the weight ratio of sulfolene to sulfolane in the initial reaction mixture being within the range of 1:1 to 2:1.

3. A process for the formation of a sulfolane from a corresponding sulfolene which comprises dissolving said sulfolene in said sulfolane to form a catalyst-free solution, introducing said solution into a hydrogenation zone containing an active base metal hydrogenation catalyst, introducing sufficient hydrogen into said hydrogenation zone to saturate the unsaturated double bond of the sulfolene, the contents of said hydrogenation zone consisting essentially of said sulfolene, said sulfolane, said catalyst, and said hydrogen, and being maintained at hydrogenation conditions for a time sufficient to convert said sulfolene to said sulfolane, and removing from said hydrogenation zone a quantity of the sulfolane equivalent to the quantity of the sulfolene hydrogenated.

4. A process for the formation of sulfolane from sulfolene which comprises dissolving sulfolene in sulfolane to form a catalyst-free solution, introducing said solution into a hydrogenation zone containing an active base metal hydrogenation catalyst, introducing sufficient hydrogen into said hydrogenation zone to saturate the unsaturated double bond of the sulfolene, the contents of said hydrogenation zone consisting essentially of sulfolene, sulfolane, said catalyst, and said hydrogen, and being maintained at hydrogenation conditions for a time sufficient to convert said sulfolene to sulfolane, and removing from said hydrogenation zone a quantity of sulfolane equivalent to the quantity of sulfolene hydrogenated.

5. A process which comprises catalytically hydrogenating 3-sulfolene dissolved in sulfolane, at a temperature below the melting point of 3-sulfolene, in a reaction mixture consisting essentially of 3-sulfolene, sulfolane, hydrogen, and an active base metal hydrogenation catalyst.

6. A process which comprises catalytically hydrogenating 2,5-dimethyl-3-sulfolene dissolved in 2,5-dimethylsulfolane, at a temperature below the melting point of the former, in a reaction mixture consisting essentially of 2,5-dimethyl-3-sulfolene, 2,5-dimethylsulfolane, hydrogen, and an active base metal hydrogenation catalyst.

7. A process which comprises forming a mixture consisting of a liquid solution of a sulfolene compound dissolved in its corresponding sulfolane compound, passing said mixture into contact with hydrogen and an active base metal hydrogenation catalyst in a reaction mixture consisting essentially of said hydrogen, said catalyst, said sulfolene compound, and said sulfolane compound, maintaining said contact at a temperature avoiding decomposition of said sulfolene compound to an extent detrimental to the hydrogenation reaction and for a time effective to hydrogenate said sulfolene compound to form its corresponding sulfolane compound, and recovering from contact with said hydrogen and hydrogenation catalyst the sulfolane compound formed by said hydrogenation plus the sulfolane compound originally present in said mixture as solvent.

8. A process which comprises forming a solution of 3-sulfolene in sulfolane and contacting same as a liquid at a temperature below the melting point of the former with sufficient hydrogen to convert all of said 3-sulfolene into sulfolane in the presence of an active base metal hydrogenation catalyst, in a reaction mixture consisting essentially of said catalyst, hydrogen, 3-sulfolene, and sulfolane.

9. A process according to claim 8 wherein a nickel catalyst is used and wherein hydrogen is used at a pressure of at least about 500 pounds per square inch gauge.

10. A process according to claim 1 wherein a temperature not exceeding 100° C. is employed.

11. A process according to claim 2 wherein a temperature below 50° C. is employed.

12. A process which comprises hydrogenating 3-sulfolene dissolved in sulfolane at temperatures below the melting point of 3-sulfolene but above the melting point of sulfolane and in the absence of an extraneous solvent, in a reaction mixture consisting essentially of 3-sulfolene, sulfolane, hydrogen, and an active base metal dehydrogenation catalyst.

13. A continuous process for the conversion of 3-sulfolene to sulfolane in high yields by catalytic hydrogenation, which comprises continuously passing a liquid solution of 3-sulfolene in sulfolane into a reaction zone containing an active base metal hydrogenation catalyst, continuously passing hydrogen into said zone and maintaining same therein at a pressure of at least 50 pounds per square inch gauge, maintaining in said zone a reaction mixture consisting essentially of said catalyst, hydrogen, 3-sulfolene, and sulfolane, maintaining a hydrogenating temperature in said zone such that decomposition of said 3-sulfolene to sulfolane does not occur to an extent preventing the hydrogenation reaction, continuously removing liquid sulfolane from said zone at a rate permitting complete hydrogenation of 3-sulfolene fed to said zone, recycling a portion of the thus-withdrawn sulfolane as the sole solvent to form said solution of 3-sulfolene in sulfolane, and recovering sulfolane as a product of the process in an amount equivalent to the 3-sulfolene fed to the process.

14. A process according to claim 1 wherein said catalyst is selected from the group consisting of nickel, cobalt, chromium, and copper-chromium oxide.

15. A process according to claim 1 wherein said catalyst is Raney nickel.

JOHN E. MAHAN.
SIG C. FAUSKE.

REFERENCES CITED

The following references are of record in the file of this patent:

UNITED STATES PATENTS

| Number | Name | Date |
|---|---|---|
| 2,435,404 | Morris | Feb. 3, 1948 |
| 2,451,298 | Morris | Oct. 12, 1948 |